(12) United States Patent
Tien (10) Patent No.: US 7,020,265 B2
(45) Date of Patent: Mar. 28, 2006

(54) METHOD FOR TRANSMITTING INFORMATION TO REMOTE SITE USING DYNAMIC TRANSMISSION NETWORK

(76) Inventor: Chung-Nan Tien, 1 Fl., No. 6, Alley 1, Lane 109, Kuo-chung Rd., Yungho City, Taipei County (TW)

( * ) Notice: Subject to any disclaimer, the term of this patent is extended or adjusted under 35 U.S.C. 154(b) by 805 days.

(21) Appl. No.: 10/163,975

(22) Filed: Jun. 6, 2002

(65) Prior Publication Data
US 2003/0229680 A1   Dec. 11, 2003

(51) Int. Cl.
G06F 15/16 (2006.01)
H04L 12/66 (2006.01)
H04M 7/00 (2006.01)
H04M 11/00 (2006.01)

(52) U.S. Cl. ............. 379/220.01; 370/356; 370/401; 379/93.01; 379/93.07; 379/900; 379/901; 709/227

(58) Field of Classification Search ............. 370/352, 370/353, 354, 355, 356, 401; 379/93.01, 379/93.07, 219, 220.01, 900, 901; 709/227
See application file for complete search history.

(56) References Cited

U.S. PATENT DOCUMENTS

| | | | | |
|---|---|---|---|---|
| 5,918,019 | A * | 6/1999 | Valencia ..................... | 709/227 |
| 6,097,804 | A * | 8/2000 | Gilbert et al. ............... | 379/230 |
| 6,292,553 | B1 * | 9/2001 | Fellingham et al. ... | 379/221.02 |
| 6,404,746 | B1 * | 6/2002 | Cave et al. .................. | 370/262 |
| 6,411,704 | B1 * | 6/2002 | Pelletier et al. ............. | 379/230 |
| 6,801,615 | B1 * | 10/2004 | Stumer et al. ......... | 379/221.02 |
| 6,879,680 | B1 * | 4/2005 | Donovan et al. ...... | 379/220.01 |
| 6,925,156 | B1 * | 8/2005 | Moore et al. ............ | 379/93.01 |
| 2001/0002914 | A1 * | 6/2001 | Aramoto ..................... | 370/535 |

* cited by examiner

Primary Examiner—Harry S. Hong
(74) Attorney, Agent, or Firm—Ladas & Parry (57) ABSTRACT

The invention relates to a method for transmitting information such as fax, voice or data to a destination information device via a dynamic transmission network. The dynamic transmission network includes one or more transmission control servers (TCSs) and one or more transmission client nodes (TCNs). The TCS is always connected to the computer network, while the TCN is dynamically connected with the computer network. When connected to the computer network, the TCN checks its system status and then registers to the TCS. After getting the information from the TCN, the TCS stores said information into a dynamic transmission route table, wherein the information includes the country code, area code, Client ID, IP address, etc. of the TCN. Once any user requests the TCS to send a information to a destination site, the TCS will locate an available TCN physically nearest to the same country code and area code as those of the destination site, and then transmits the information to the TCN through the computer network. The TCN then sets up a dial-up connection with the destination information device through the public switched telephone network (PSTN) to send the information to the destination site.

23 Claims, 9 Drawing Sheets

METHOD FOR TRANSMITTING INFORMATION TO REMOTE SITE USING DYNAMIC TRANSMISSION NETWORK

BACKGROUND OF THE INVENTION

Figure 1:
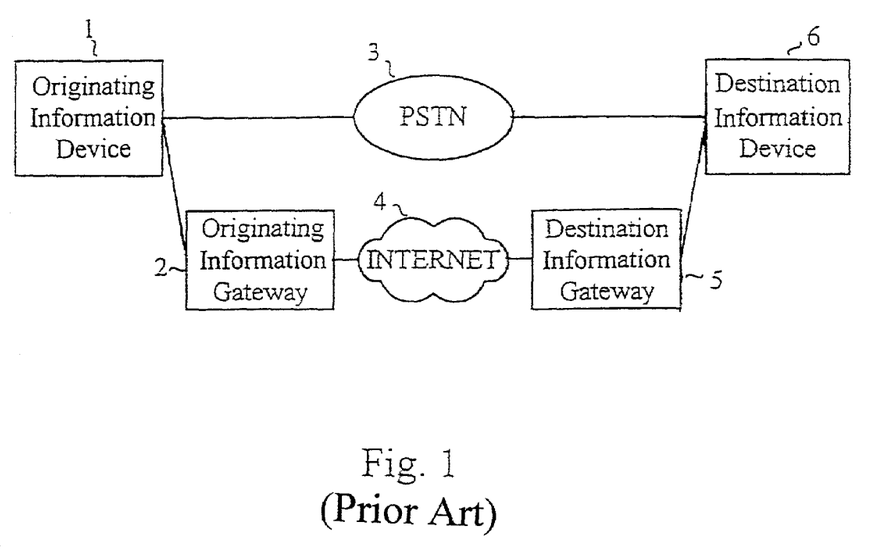
FIG. 1 is the block diagram of a conventional information transmission system.

Nowadays, a lot of information, such as fax (facsimile), voice and data, is transmitted from an originating site to a destination site through the PSTN (public switched telephone network) as shown in FIG. 1. The connection between the originating site and the destination site is formed by setting up a dial-up line and then sending the analog information. However, the cost of such direct dialing lessens the revenues of business companies. Information can be transmitted at a very low cost through the Internet. Currently, many business and telecommunication service providers use the Internet as medium to have their information transmitted as shown in FIG. 1. In the case that a company has information gateways in two countries, an originating information gateway 2, for example, in Taipei, Taiwan and a destination information gateway 5, for example, in Los Angeles, USA, when a company's staff member, for example, in Kaohsiung, Taiwan wants to send a fax to a destination information device 6 in New York, USA, he has to send the fax from a originating information device 1 to the originating information gateway 2 first, and the originating information gateway 2 converts the fax into a computer readable stream or file data and then transmits the converted fax data to the destination information gateway 5 in Los Angeles through Internet 4. The destination information gateway 5, after receiving the fax data, converts the received fax data back into the original fax, which forms a dial-up line with the destination information device 6 through the PSTN, and sends the original fax to the destination information device 6 through the PSTN. In this way, the person who sends a fax from Taiwan to USA will be charged only for a local or long distance call in addition to any charge to international telecommunication services.

Even so, there still exist some major problems in the above-mentioned conventional information transmission system. First, even if the telecommunication service providers or companies may establish information gateways as many as possible for transmitting information via the Internet so as to reduce the cost of the international telecommunication services, it is still possible that users will be charged for long distance calls if these gateways are not established as many as enough in both the originating and destination countries. For example, in case the service provider only establishes an originating information gateway in Taipei, Taiwan and a destination information gateway in Los Angeles, USA a user in Taipei sends a fax to Los Angeles, the actual telecom cost will be only two local-loop-call charges, which are sending the fax from Taipei, Taiwan to the originating information gateway in Taipei and then sending the fax from the destination information gateway in Los Angeles to the destination fax device in Los Angeles. But in case a user in Kaohsiung, Taiwan wants to send a fax to New York, USA, the actual telecom cost will be two long-distance-call charges from Kaohsiung to Taipei and from Los Angeles to New York.

It is very difficult and costly for any companies and service providers to have information gateways across in the country. Also, it is infeasible to have information gateways in all other countries.

Furthermore, even if users can reduce the transmission cost by the use of the Internet technology as mentioned above, the reduced cost is limited. For this reason, telecommunication service providers and companies still need to establish a line between the destination information gateway and the destination information device through the PSTN. In general, the volume of information can be processed concurrently largely depends upon the number of the telephone lines physically built. The more telephone lines are built, the more the information can be processed concurrently.

Furthermore, in recent years, more and more computers are connected with the most well known computer network, the Internet, by various types of technologies such as leased line, ISDN, cable modem, xDSL, etc. Most of the computers are only "dynamically" connected to the Internet. For example, when a computer user wants to check e-mail or browse some web sites from the Internet, he/she turns on his/her computer and connects to the Internet by some software programs, such as dial-up programs. Once the computer is connected to the Internet, the computer user can check his/her e-mails or browse some web sites. The computer user can disconnect his/her computer from the Internet once he/she finishes the job and turn-off his/her computer.

Some of the above-mentioned computers "dynamically" connected to the Internet have fax modems and available phone lines for performing dial-up request, sending fax or voice etc., and may exist everywhere in the world. Such computers can be used as transmission client nodes (TCNs) of the present invention and will be introduced in detail later.

SUMMARY OF THE INVENTION

The present invention discloses a method and system for transmitting information from an originating information device to a remote destination information device through the Internet by using a dynamic transmission network. The system comprises a transmission control server (TCS) and a plurality of transmission client nodes (TCNs) which are independently and dynamically connected to the TCS via the Internet. According to the present invention, information is sent to the destination site first by transmitting to the TCS, which in turn transmits the information to the available TCN (destination TCN) nearest to the destination site by looking up in a dynamic transmission route table for the information on the available TCN, such as country code, area code, phone line number and status of the telephone line that can reach the TCN. The destination TCN, after receiving information, sends the information to the destination information device. Each TCN will register its information to TCS when it connects to the TCS through a computer network, and the TCS stores the information into the dynamic transmission route table by which the TCS can determine which TCN is most suitable for sending the information to. In this way, though each TCN does not have numerous phone lines, the TCS may control thousands of TCNs simultaneously.

According to the present invention, the dynamic transmission network can also flexibly send information to the TCS by querying the TCS first about the available TCN nearest to the originating information device, and then send the information to the available TCN. The TCN, after receiving information, transmits the received data to the TCS. After that the above-mentioned process of information transmission to the destination information device can be conducted.

BRIEF DESCRIPTION OF THE DRAWINGS

The present invention is described below by way of presenting examples with reference to accompanying drawings, which will the technical contents, characteristics and effectiveness of the present invention easy to understand, wherein.

DETAILED DESCRIPTION OF THE INVENTION

Figure 2A:
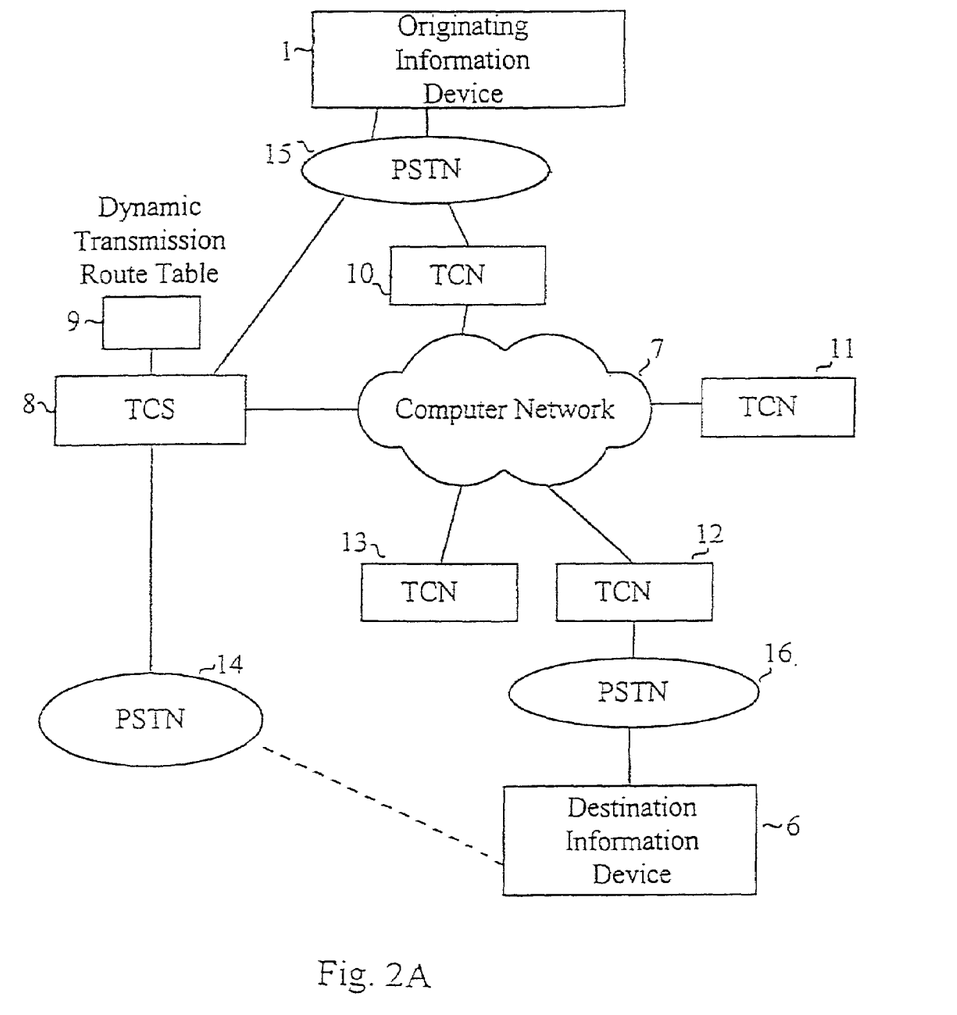
FIG. 2A is the block diagram of a dynamic transmission network according to a first embodiment of the present invention.

FIG. 2A illustrates a schematic view of a dynamic transmission network, in accordance with the present invention, that the dynamic transmission network comprises a TCS (8) and a plurality of TCNs (10, 11, 12, 13). According to the present invention, TCS (8) and TCNs (10, 11, 12, 13) can be different kinds of computers. The TCS (8) includes a dynamic transmission route table (9) which contains the client registration data of each TCN such as client ID, IP address, country code, area code, phone number, line status, etc. The TCS (8) is always connected to a computer network (7) via any available network connection technologies including, for example, leased line, ISDN line, twisted pair lines, cable modem, xDSL, etc. The TCS (8) may also include one or more phone lines as backup transmission lines so as to connect to the public switched telephone network (PSTN) (14) when all of the TCNs (10, 11, 12, 13) are unavailable. The TCNs (10, 11, 12, 13) may be connected dynamically to the computer network (7) via any available network connection technologies, including, for example, leased line, ISDN lines, twisted pair lines, cable modems, XDSL, etc. Each of the TCNs (10, 11, 12, 13) may also include at least one available phone line (not shown) and a fax modem to serve as an information device which can send information such as fax, voice or data through PSTN by fax modem in accordance with known technologies, each TCN has client registration data stored in it including client ID, country code, area code, phone number, line status, etc., in which client registration data is reported back to TCS (8) periodically by TCN. An originating information device (1) and a destination information device (6) can be any analog transmission machines, such as standard voice phones, standard fax machines or personal computers with fax modem.

In the process of the present invention of sending information from the originating information device (1) to the destination information device (6) the information is sent to the TCS (8) first. In detail, the information can be sent from the originating information device (1) to the TCS (8) by one of the following three procedures:

(A) The originating information device (1) sets up a dial-up connection with the TCS (8) through a PSTN (15) to send information.

Figure 2B:
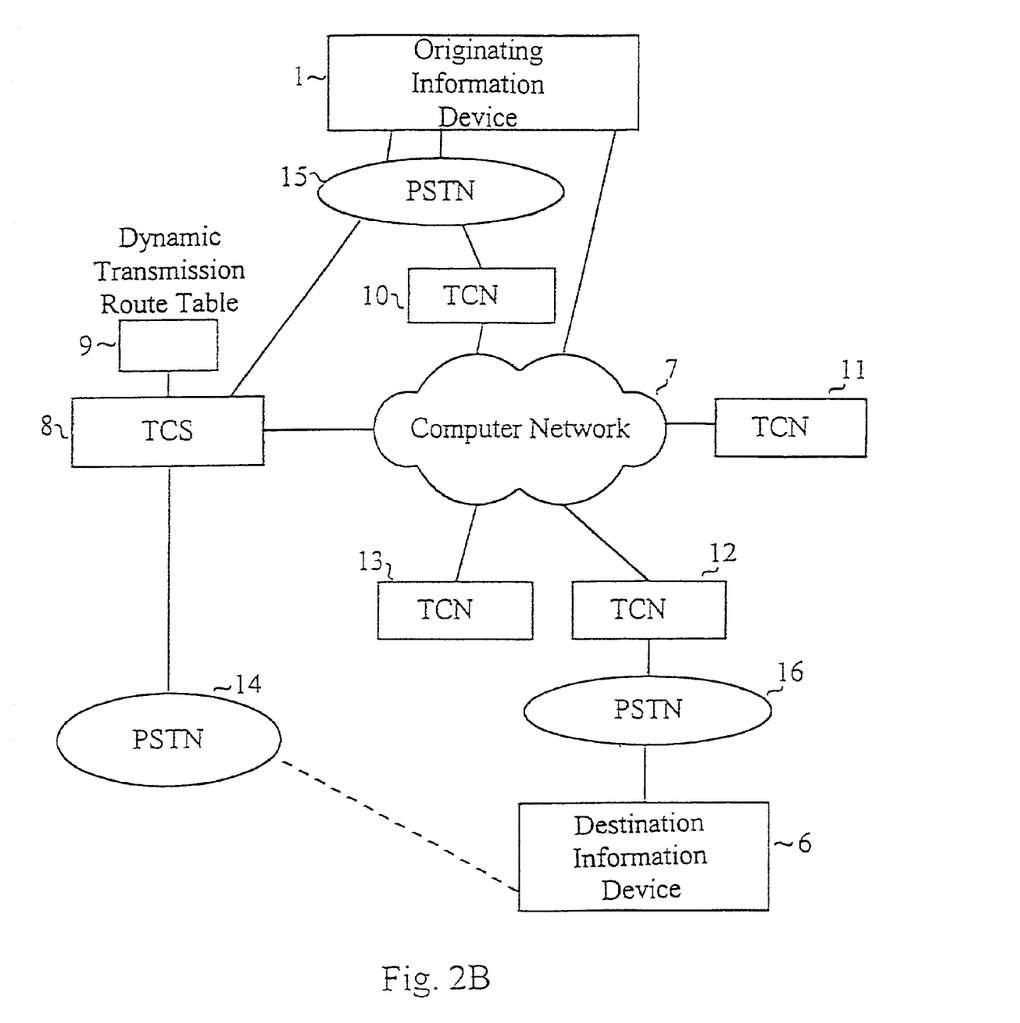
FIG. 2B is the block diagram of one embodiment of Dynamic transmission network of the present invention with different kinds of originating information device.
Figure 4:
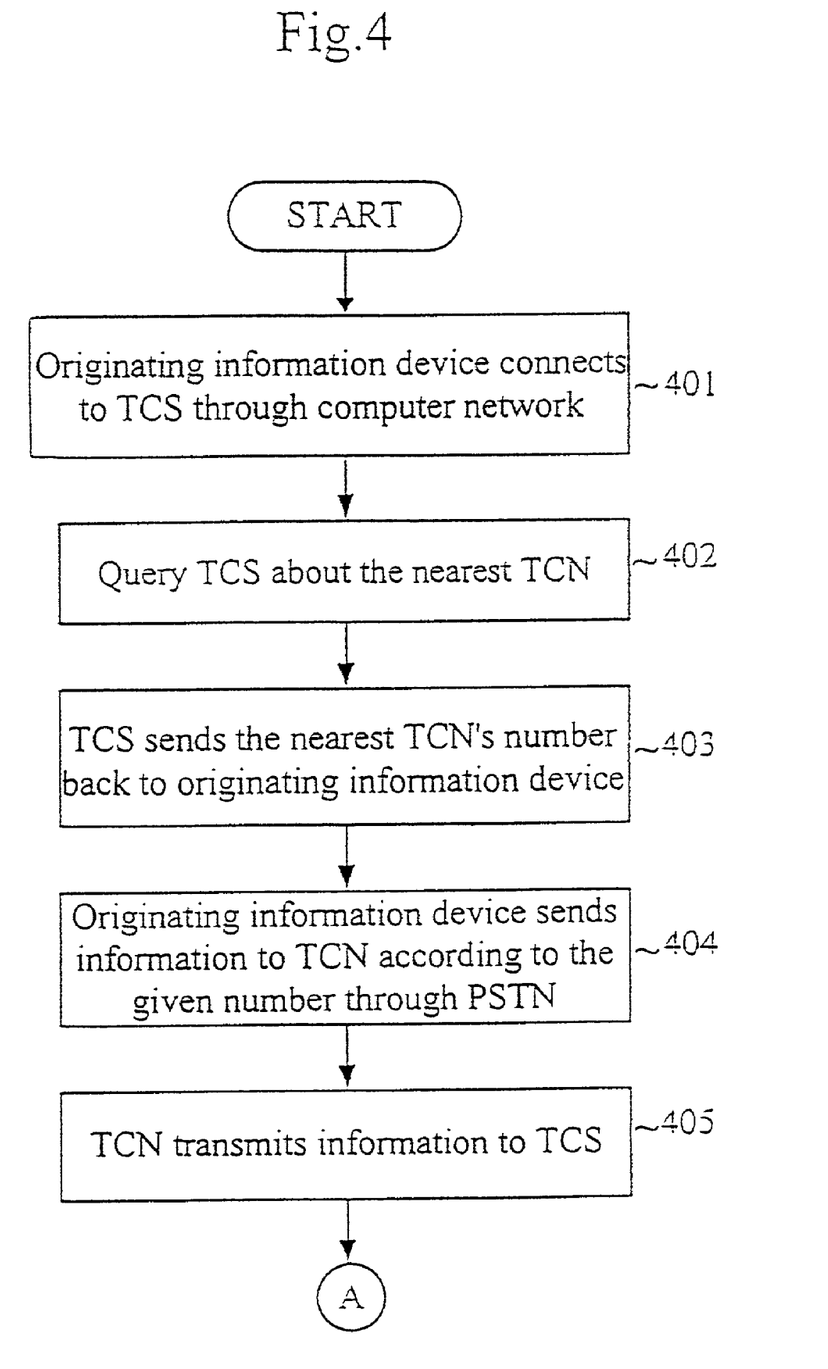
FIG. 4 is the flow diagram illustrating one of the operational sequences of the embodiment of the way that user sends information to TCS through TCN.

(B) As illustrated in FIGS. 2B and 4, before the originating information device (1) sends information to the TCS (8), it will query the TCS (8) about the available TCN nearest to the originating information device (1) (step 402). In response, the TCS (8) looks up a dynamic transmission route table (9) connected thereto according to the country code, area code, phone number and system status of the originating information device (1), the current status of the TCNs, etc., and then forwards the information of the available TCN (10) nearest to the originating information device (1) (step 403). Thus, the originating information device (1) sets up a dial-up connection with the TCN (10) and sends information to the TCN (10) (step 404). Then, the TCN (10) transmits the information to the TCS (8) for its subsequent transmission to the destination information device (6) (step 405).

(C) The originating information device (1) first converts information into computer readable stream or file data by known techniques and then transfers the converted data to the TCS (8) through the computer network (7) (step 401). Procedure (C) can be utilized in the case where the originating information device (1) is a computer connected with the computer network (7).

Procedure (B) is very useful and cost-effective in the case where the telephone charge between the originating information device (1) and the TCS (8) is expensive. For example, in the case that a service provider only establishes one TCS in Taiwan, and only one TCN is available in Japan. If a user in Japan desires to have a fax sent to USA, the fax can be sent to the available TCN in Japan and transmitted to the TCS in Taiwan according to procedure (B). Next, the TCS in Taiwan transfers the fax to a TCN in USA, which then sends the fax to the destination information device in USA. The transmission process between the TCS in Taiwan and the TCN in USA is described below in detail.

Figure 5A:
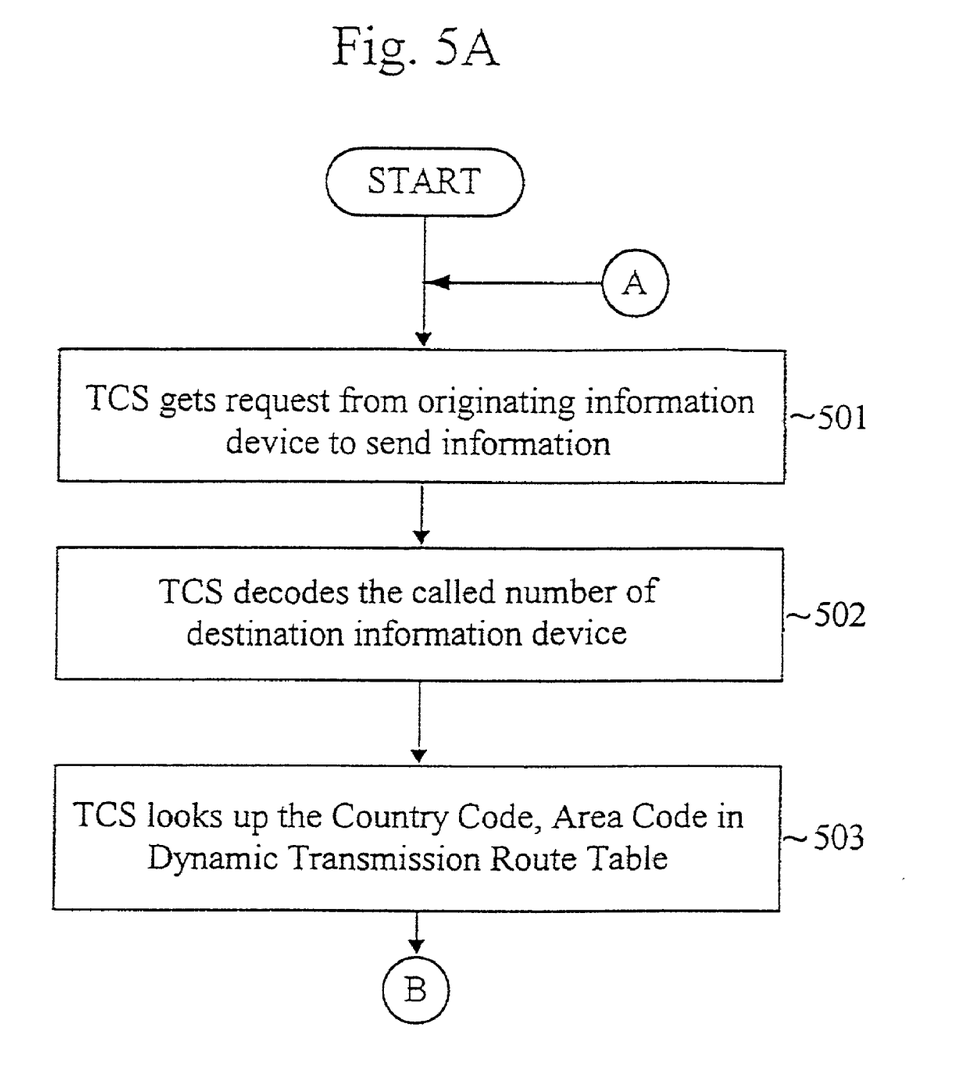
FIGS. 5A and 5B are the flow diagrams illustrating one of the operational sequences of the Dynamic transmission network according to one embodiment of the present invention shown in FIGS. 2–3.
Figure 5B:
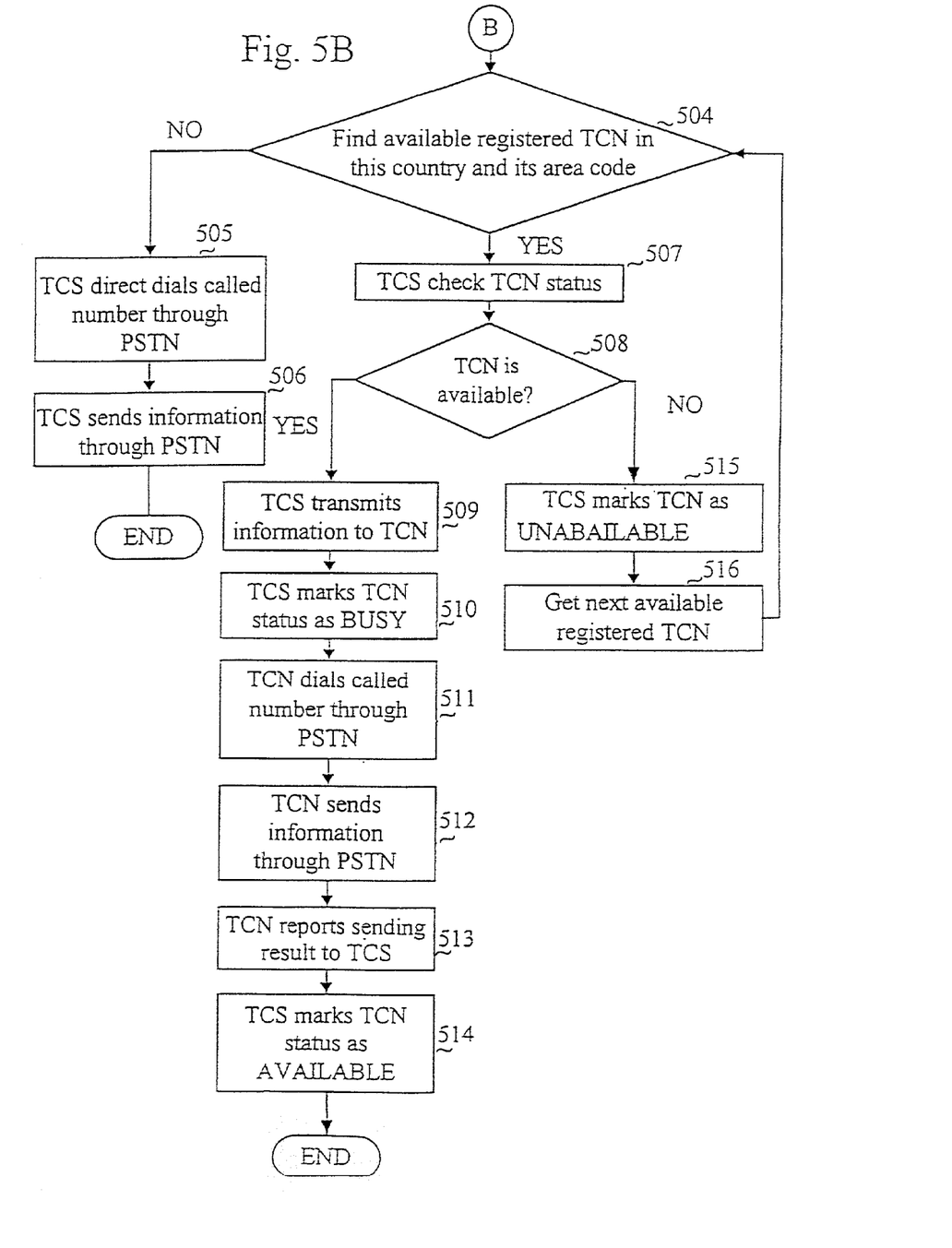

Referring to FIGS. 2A, 5A and 5B, when the TCS (8) is required to send information from the originating information device (1) to the destination information device (6) (step 501), the TCS (8) will convert the received information into a computer readable stream or file data, and decode the telephone number of the requested destination information device by collecting, for example, the dialing number sequence sent by the originating information device (1) or by obtaining a predetermined number for the destination information device (6) stored in the database (not shown) (step 502). The TCS (8) then looks up the dynamic transmission route table (9) according to the country code, area code, and phone number of the decoded or obtained telephone number of the destination information device (6) to locate the available TCN nearest to the destination information device (6) (step 503). According to the present invention, the dynamic transmission route table (9) stores the information and status of all the subscribed TCNs (10, 11, 12 13), such as country code, area code, phone number, IP address, phone line status, node system status, etc. If the TCS (8) can find any TCN which is "AVAILABLE", for example, TCN (12), in FIG. 2A (step 504), the TCS (8) will attempt to connect to the available TCN (12) through the computer network (7) and send system check information to the TCN (12) (step 507). In response, the TCN (12) tests its current node status and returns it to the TCS (8). If getting "AVAILABLE" message from the TCN (12) (step 508), the TCS (8) transmits the converted information and the destination fax number to the TCN (12) (step 509) and then marks the TCN (12) as "BUSY" in the dynamic transmission route table (9) (step 510). Next, the TCN (12) sets up a dial-up connection with the destination information device (6) (step 511), decodes the converted information into the original information and transfers the original information to the destination information device (6) (step 512). After that, the TCN (12) acknowledges the completion of transmission (step 513) by the TCS (8), and the TCS (8) marks the TCN (12) as "AVAILABLE" in the dynamic transmission route table (9) (step 514). The TCN (12) then will wait for the next sending of information.

In step 508, if getting an "UNAVAILABLE" message from the TCN or fails to connect to the TCN, the TCS (8) marks the TCN as "UNABAILABLE" in the dynamic transmission route table (9) (step 515) and continues to locate the next nearest and available TCN for sending information to the destination information device (6) (step 516).

In step 504, if not able to find any available TCN for the destination information device (6), the TCS (8) then directly sets up a dial-up connection with the destination information device (6) through a PSTN (step 505) by a backup transmission phone line and then sends the information to the destination information device (step 506).

Figure 6:
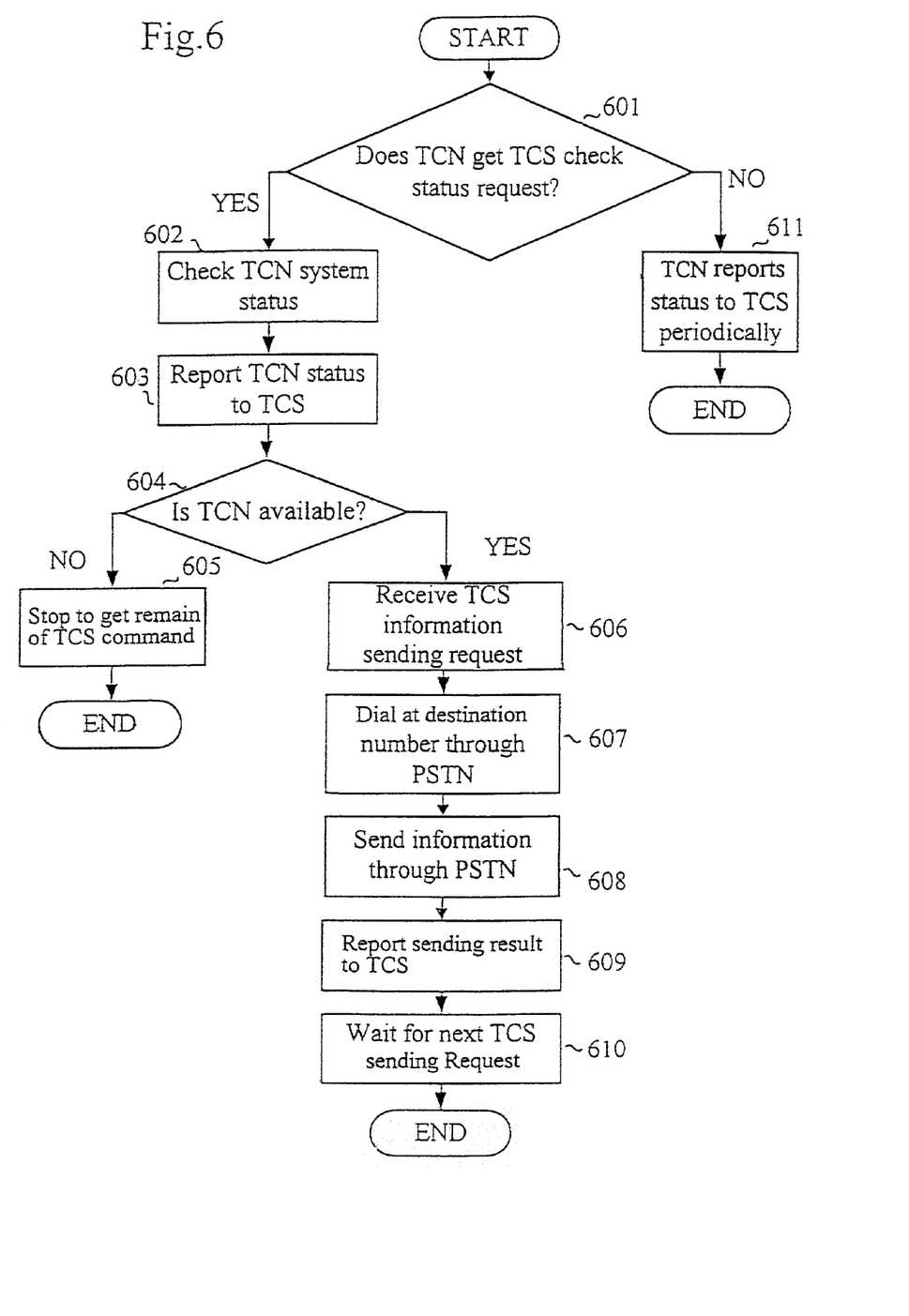
FIG. 6 is the flow diagram illustrating one of the operations of the TCN according to one embodiment of the present invention.

According to an embodiment of the present invention, FIGS. 2A and 6 illustrate a flow diagram of the operations of the TCNs (10, 11, 12, 13), when requested by the TCS (8) to check its system status (step 601), the TCN will check its own system status (step 602) and forward the checked status, such as client ID, IP address of TCN, country code, area code, line status, etc. to the TCS (8) (step 603). If being "UNAVAILABLE" (step 604), the TCN stops receiving any request from the TCS (8) (step 605). Instead, the TCS (8) will try to locate another "AVAILABLE" TCN to transmit information as the above-mentioned process shown in FIG. 5 (steps 515 and 516). If the TCN is "AVAILABLE" (step 604), the TCS (8) will transmit the converted information to the available TCN (step 606). The TCN converts the converted information back into the original information and sends the original information to the destination information device (6) (step 608). After that, the TCN acknowledges the completion of transmission by the TCS (8) through the computer network (7) (step 609), and will wait for the next request from TCS (8) (step 610).

If not receiving a request from the TCS (8) for checking its system status (step 601), the TCN periodically reports its client ID, IP address, country code, area code, phone number, line status, etc. to the TCS (8) (step 611) so as to update the dynamic transmission route table (9) of the TCS (8).

Figure 3A:
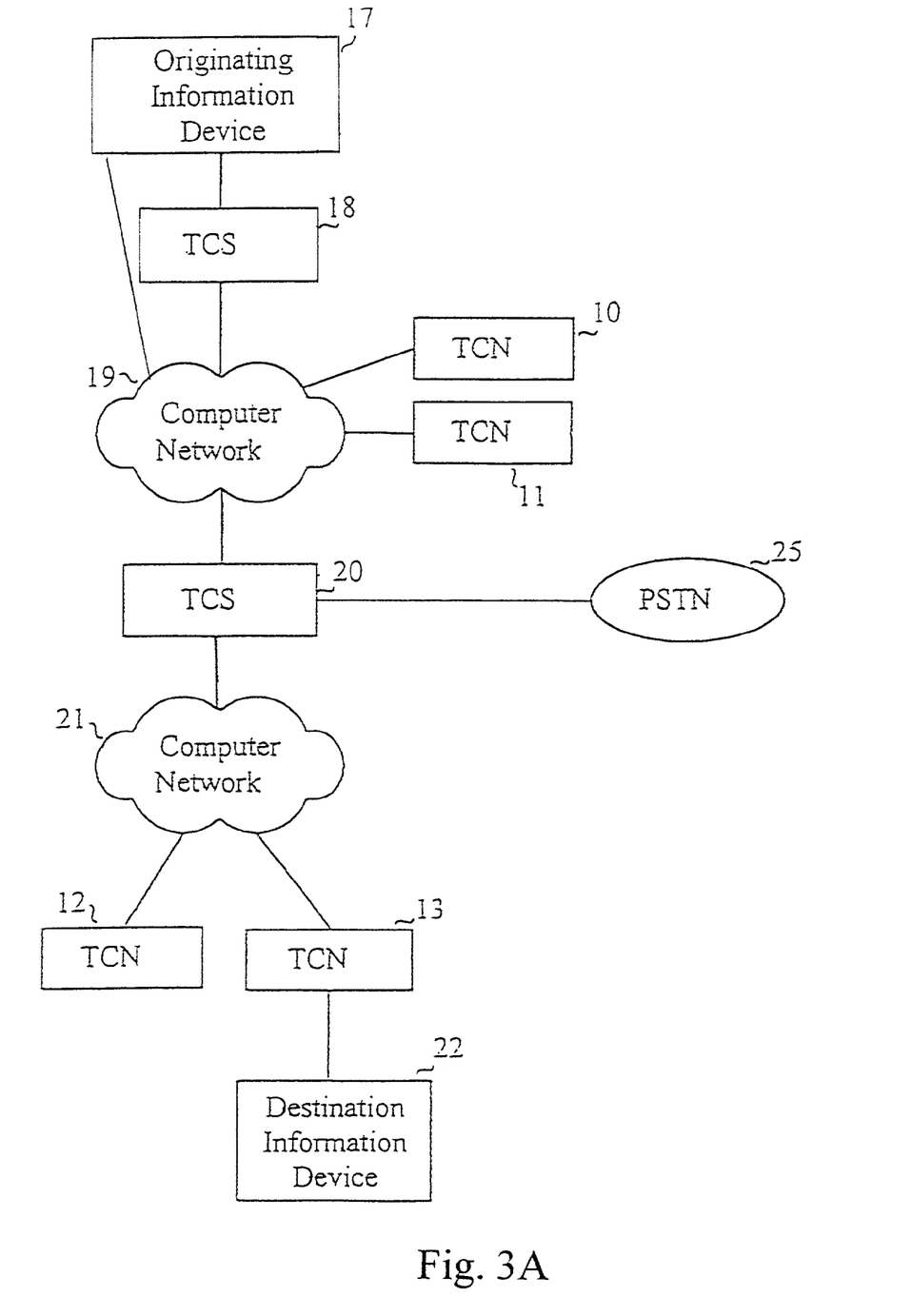
FIGS. 3A and 3B are the block diagrams of the embodiments of the Hierarchical Dynamic transmission network according to the present invention.

According to another embodiment of the present invention, FIG. 3A depicts a block diagram, in which the dynamic transmission network can operate in a hierarchical system according to an embodiment of the present invention. Namely, the dynamic transmission network comprises a plurality of TCSs and a plurality of TCNs, wherein each of the TCSs controls the plurality of TCNs through a local computer network. For example, originating information device (17), TCS (18), computer network (19), TCN (10) and TCN (11) are all installed in Taiwan, and TCS (20), computer network (21), TCN (12), TCN (13), PSTN (25) and destination information device (22) are all installed in USA. If the originating information device (17) wants to send faxes to the destination information device (22), the originating information device (17) will send information to TCS (18) first, the TCS (18) will have to locate the TCS (20) nearest to the destination information device (22) and transmit the sending request to the TCS (20). As mentioned above, the TCS (20) will locate the available TCN (13) nearest to the destination information device (22) for the subsequent transmission. In this way, the TCS (18) in Taiwan needs no control of any of the TCNs (12,13) in USA. The hierarchical dynamic transmission network can effectively reduce the complexity of the overall system.

Figure 3B:
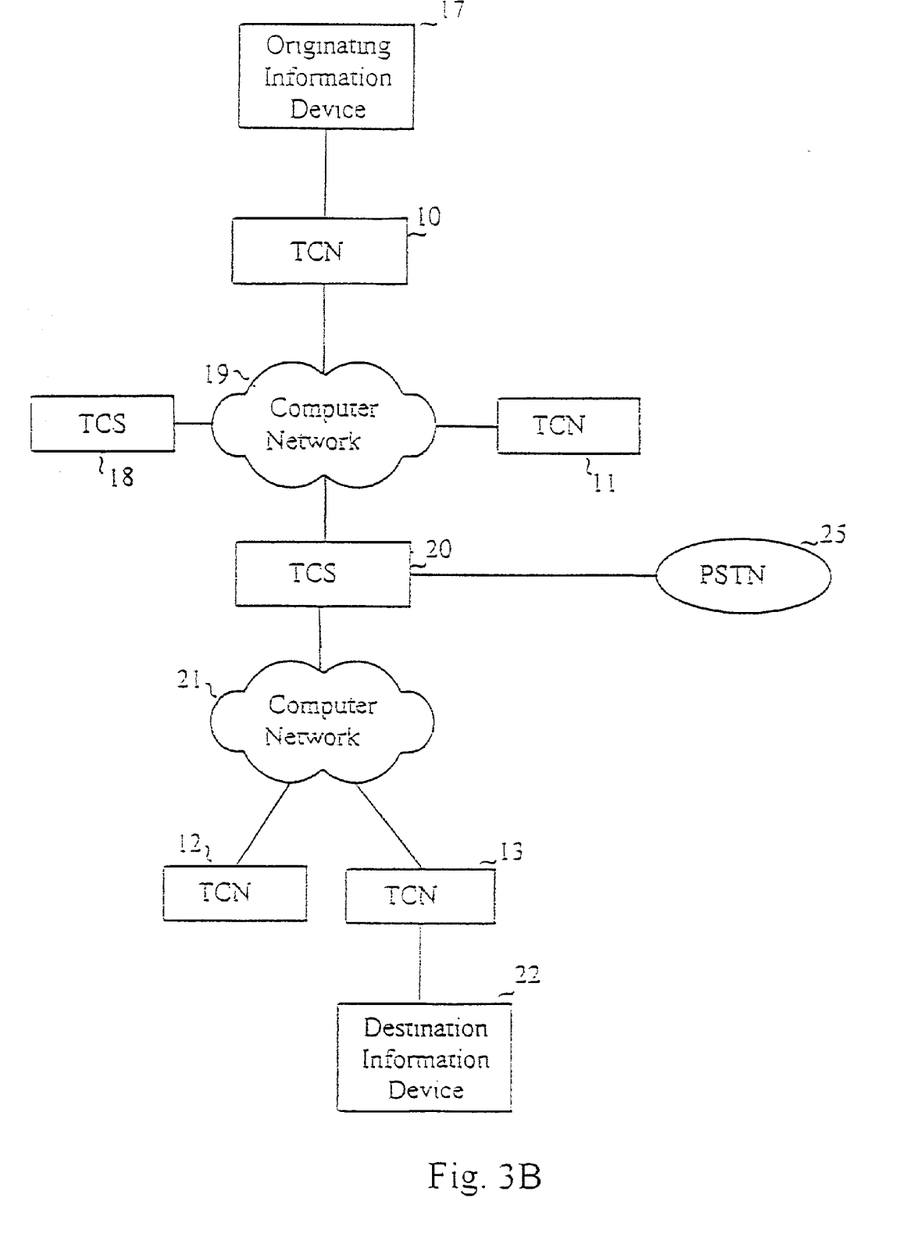

According to another embodiment of the present invention, FIG. 3B depicts a block diagram, in which the dynamic transmission network can operate in a hierarchical system according to another embodiment of the present invention. Namely, the dynamic transmission network comprises a plurality of TCSs and a plurality of TCNs, wherein each of the TCSs controls the plurality of TCNs through a local computer network. For example, originating information device (17), TCS (18), computer network (19), TCN (10) and TCN (11) are all installed in Taiwan, and TCS (20), computer network (21), TCN (12), TCN (13), PSTN (25) and destination information device (22) are all installed in USA. If the originating information device (17) wants to send faxes to the destination information device (22), the method is shown as follows: First, the first TCS (18) in Taiwan locates a first and available TCN (10) physically nearest to the originating information device (17) according to the system information of the at least one TCN stored in the dynamic transmission routing table (9). Second, the originating information device (17) transmits the information to the first available TCN (10). Third, the first available TCN (10) converts the information into a computer readable stream or file data and transmits the converted data to the first TCS (18). Fourth, the first TCS (18) locates a second TCS (20) in USA physically nearest to the destination information device (22) according to the system information of the TCSs by the first TCS (18). Fifth, the first TCS (18) transmits the converted data to the second TCS (20) through a first computer network (19). Sixth, the second TCS (20) locates a second available TCN (13) physically nearest to the destination information device (22) according to the system information of the TCNs stored in a dynamic transmission routing table (not shown) of the second TCS (20). Seventh, the second TCS (20) transmits the converted data to the second TCN (13) through a second computer network (21). And at last, the second TCN (13) converts the converted data back to the information and transmits the information to the destination information device (22). In this way, the TCS (18) in Taiwan needs no control of any of the TCNs (12,13) in USA. The hierarchical dynamic transmission network can effectively reduce the complexity of the overall system.

In view of the above, the present invention provides the dynamic transmission network that utilizes a plurality of TCSs and a plurality of TCNs that can send information via computer network. Each of the TCSs does not have to establish too many phone lines to send information. In fact, if the amount of TCNs is large enough, the TCS will need no phone line to send information. Each TCN does not need many phone lines to send information either. Actually, one phone line is enough according to the present invention. Nor will each of the TCNs have to not always connect to computer network. The TCS only has to control those TCNs that are "ON-LINE", so that the sending of information can be proceeded.

In real case, for example, the TCS can be built up by a telecommunication service provider and the TCN can be any of the personal computers which is dynamically connected with the Internet and has a certain computer program installed and executed therein, wherein the computer program, for example, can be downloaded from the Internet, installed the computer program into the personal computer, and inputted the necessary client registration data while computer program is executed such as client ID, country code, area code and phone number of the available phone line, etc. While the personal computer is connected with the Internet, the computer program will send client registration data to TCS automatically, then the TCS can use any of the TCNs to transmit information. In this way, the telecommunication service provider can transmit thousands of information simultaneously with only one TCS and even without any physical phone line.

The computer program mentioned above can be recorded on a computer-readable medium, such as soft disks, CDROMs, etc.

From the invention thus described, it will be obvious that the embodiments and description are not indeed to limit the invention. The invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method for transmitting information from an originating information device to a destination information device via a dynamic transmission network comprising a transmission control server (TCS) and at least one transmission client node (TCN), the method comprising the steps of:
   (i) establishing a dial-up connection between the originating information device and the TCS through a first public switched telephone network (Public Switched Telephone Network, PSTN) and transmitting information from the originating information device to the TCS;
   (ii) locating an available TCN physically nearest to the destination information device according to system information of the at least one TCN stored in the TCS;
   (iii) transmitting the information from the TCS to the TCN through a computer network; and
   (iv) transmitting the information from the TCN to the destination information device through a second PSTN.

2. A method for transmitting information from an originating information device to a destination information device via a dynamic transmission network comprising a transmission control server (TCS) and at least one transmission client node (TCN), the method comprising the steps of:
   (i) converting the information into a computer readable stream or file data, transferring the converted data to the TCS through a computer network by the originating information device;
   (ii) locating an available TCN physically nearest to the destination information device according to system information of the at least one TCN stored in the TCS by the TCS;
   (iii) transmitting the converted data from the TCS to the TCN through a computer network; and
   (iv) converting the converted data back to the information by the TCN and transmitting the information to the destination information device through a PSTN from the TCN.

3. A method for transmitting information from an originating information device to a destination information device via a dynamic transmission network comprising a transmission control server (TCS) and at least one transmission client node (TCN), the method comprising the steps of:
   (i) upon querying by the originating information device, the TCS locating a first and available TCN physically nearest to the originating information device according to the system information of the at least one TCN stored in the TCS;
   (ii) transmitting the information to the first TCN through a first PSTN by the originating information device;
   (iii) converting the information into a computer readable stream or file data and transmitting the converted data to the TCS through a computer network by the first TCN;
   (iv) locating a second and available TCN physically nearest to the destination information device according to system information of the at least one TCN stored in the TCS by the TCS;
   (v) transmitting the converted data from the TCS to the second TCN through the computer network by the TCS; and
   (vi) converting the converted data back to the information by the second TCN and transmitting the information to the destination information device through a second PSTN from the second TCN.

4. The method of claim 1 or 2, further comprising a step between step (ii) and step (iii) of checking the system status of the TCN before transmitting information to the TCN by the TCS.

5. The method of claim 3, further comprising a step between step (i) and step (ii) of checking the system status of the first TCN by the TCS before transmitting information to the first TCN by the originating information device.

6. The method of claim 3, further comprising a step between step (iv) and step (v) of checking the system status of the second TCN before transmitting information to the second TCN by the TCS.

7. The method of claim 1 or 2, further comprising a step between the step (ii) and (iii) of querying next TCN if the TCS fails to get the system available response from the TCN it currently queries and repeating this step until an available TCN is found by the TCS.

8. The method of claim 3, further comprising a step between the step (i) and (ii) of querying next TCN if the TCS fails to get the system available response from the TCN it currently queries and repeating this step until a first and available TCN is found by the TCS.

9. The method of claim 3, further comprising a step between the step (iv) and (v) of querying next TCN if the TCS fails to get the system available response from the TCN it currently queries and repeating this step until a second and available TCN is found by the TCS.

10. The method of claim 1, 2 or 3, further comprising the step of reporting the status back to the TCS after the transmission of information is completed by the TCN.

11. The method of claim 1, 2 or 3, wherein if the TCS can not locate any physically nearest and available TCN of the destination information device, the TCS sets up a dial-up connection with the destination information device directly through a PSTN by a backup transmission phone line and sends the information to the destination information device through said PSTN.

12. A method for transmitting information from an originating information device to a destination information device via a hierarchical dynamic transmission network comprising a plurality of TCSs, a plurality of TCNs, a plurality of computer networks and a plurality of public switched telephone networks (PSTNs), the method comprising the steps of:
   (i) establishing a dial-up connection between the originating information device and a first TCS physically nearest to the originating information device through a first PSTN and transmitting information from the originating information device to the first TCS;

(ii) converting the information into a computer readable stream or file data by the first TCS;
(iii) locating a second TCS physically nearest to the destination information device according to the system information of the TCSs by the first TCS;
(iv) transmitting the converted data from the first TCS to the second TCS through a first computer network;
(v) locating an available TCN physically nearest to the destination information device according to the system information of the TCNs stored in the second TCS by the second TCS;
(vi) transmitting the converted data from the second TCS to the TCN through a second computer network; and
(vii) converting the converted data back to the information by the TCN and transmitting the information to the destination information device through a second PSTN from the TCN.

13. A method for transmitting information from an originating information device to a destination information device via a hierarchical dynamic transmission network comprising a plurality of TCSs, a plurality of TCNs, a plurality of computer networks and a plurality of public switched telephone networks (PSTNs), the method comprising the steps of:
(i) converting the information into a computer readable stream or file data and transferring the converted data to a first TCS physically nearest to the originating information device through a first computer network by the originating information device;
(ii) locating a second TCS physically nearest to the destination information device according to the system information of the TCSs by the first TCS;
(iii) transmitting the converted data from the first TCS to the second TCS through the first computer network;
(iv) locating an available TCN physically nearest to the destination information device according to the system information of the TCNs stored in the second TCS by the second TCS;
(v) transmitting the converted data from the second TCS to the TCN through a second computer network; and
(vi) converting the converted data back to the information by the TCN and transmitting the information to the destination information device through a PSTN from the TCN.

14. A method for transmitting information from an originating information device to a destination information device via a hierarchical dynamic transmission network comprising a plurality of TCSs, a plurality of TCNs, a plurality of computer networks and a plurality of public switched telephone networks (PSTNs), the method comprising the steps of:
(i) upon querying by the originating information device, a first TCS physically nearest to the originating information device locating a first and available TCN physically nearest to the originating information device according to the system information of the at least one TCN;
(ii) transmitting the information to the first TCN through a first PSTN by the originating information device;
(iii) converting the information into a computer readable stream or file data and transmitting the converted data to the first TCS through a first computer network by the first TCN;
(iv) locating a second TCS physically nearest to the destination information device according to the system information of the TCSs by the first TCS;
(v) transmitting the converted data from the first TCS to the second TCS through the first computer network;
(vi) locating a second available TCN physically nearest to the destination information device according to the system information of the TCNs stored in the second TCS by the second TCS;
(vii) transmitting the converted data from the second TCS to the second TCN through a second computer network; and
(viii) converting the converted data back to the information by the second TCN and transmitting the information to the destination information device through a second PSTN from the second TCN.

15. The method of claim 12, further comprising a step between step (v) and step (vi) of checking the system status of the TCN before transmitting information to the TCN by the second TCS.

16. The method of claim 13, further comprising a step between step (iv) and step (v) of checking the system status of the TCN before transmitting information to the TCN by the second TCS.

17. The method of claim 14, further comprising a step between step (i) and step (ii) of checking the system status of the first TCN by the first TCS before transmitting information to the first TCN by the originating information device.

18. The method of claim 14, further comprising a step between step (vi) and step (vii) of checking the system status of the second TCN before transmitting information to the second TCN by the second TCS.

19. The method of claim 12, further comprising a step between the step (v) and (vi) of querying next TCN if the second TCS fails to get the system available response from the TCN it currently queries and repeating this step until an available TCN is found by the second TCS.

20. The method of claim 13, further comprising a step between the step (iv) and (v) of querying next TCN if the second TCS fails to get the system available response from the TCN it currently queries and repeating this step until an available TCN is found by the second TCS.

21. The method of claim 14, further comprising a step between the step (i) and (ii) of querying next TCN if the first TCS fails to get the system available response from the TCN it currently queries and repeating this step until a first available TCN is found by the first TCS.

22. The method of claim 14, further comprising a step between the step (vi) and (vii) of querying next TCN if the second TCS fails to get the system available response from the TCN it currently queries and repeating this step until a second available TCN is found by the second TCS.

23. The method of claim 12, 13 or 14, wherein if the there is no available TCN physically nearest to the second TCS, the second TCS sets up a dial-up connection with the destination information device directly through a PSTN by a backup transmission phone line and transmits the information to the destination information device through said PSTN.

* * * * *